United States Patent
Kadam et al.

(10) Patent No.: US 7,237,122 B2
(45) Date of Patent: Jun. 26, 2007

(54) METHOD AND APPARATUS TO FACILITATE SOFTWARE INSTALLATION USING EMBEDDED USER CREDENTIALS

(75) Inventors: Sunil S. Kadam, Hillsboro, OR (US); Tianying Fu, Beaverton, OR (US); Michael P. Bacus, Tigard, OR (US)

(73) Assignee: McAfee, Inc., Santa Clara, CA (US)

( * ) Notice: Subject to any disclaimer, the term of this patent is extended or adjusted under 35 U.S.C. 154(b) by 861 days.

(21) Appl. No.: 10/027,615

(22) Filed: Oct. 19, 2001

(65) Prior Publication Data

US 2003/0079126 A1 Apr. 24, 2003

(51) Int. Cl.
*H04L 9/32* (2006.01)
*H04L 9/00* (2006.01)
*G06F 9/445* (2006.01)

(52) U.S. Cl. .......... 713/191; 726/19; 726/21; 726/26; 726/1; 717/174

(58) Field of Classification Search ........... 713/191; 717/174, 176, 177; 726/21, 26, 19
See application file for complete search history.

(56) References Cited

U.S. PATENT DOCUMENTS

| | | | | |
|---|---|---|---|---|
| 5,956,408 A | * | 9/1999 | Arnold | 713/189 |
| 5,960,204 A | * | 9/1999 | Yinger et al. | 717/176 |
| 6,067,622 A | * | 5/2000 | Moore | 726/31 |
| 6,075,943 A | * | 6/2000 | Feinman | 717/175 |
| 6,151,643 A | * | 11/2000 | Cheng et al. | 710/36 |
| 6,226,747 B1 | * | 5/2001 | Larsson et al. | 726/31 |
| 6,269,401 B1 | | 7/2001 | Fletcher et al. | 709/224 |
| 6,654,888 B1 | * | 11/2003 | Cooper et al. | 713/190 |
| 6,754,823 B1 | * | 6/2004 | Kurzweil et al. | 713/179 |
| 6,788,800 B1 | * | 9/2004 | Carr et al. | 382/100 |
| 6,792,549 B2 | * | 9/2004 | Colvin | 726/30 |
| 6,799,277 B2 | * | 9/2004 | Colvin | 726/22 |
| 6,854,016 B1 | * | 2/2005 | Kraenzel et al. | 709/229 |
| 6,865,737 B1 | * | 3/2005 | Lucas et al. | 717/178 |
| 6,973,647 B2 | * | 12/2005 | Crudele et al. | 717/177 |
| 6,993,650 B2 | * | 1/2006 | Landers et al. | 713/100 |

(Continued)

OTHER PUBLICATIONS ePolicy Orchestrator 2.0 Installation Guide, Networks Associates Technology, Inc., Issued May 2001.

(Continued)

*Primary Examiner*—Christopher Revak
*Assistant Examiner*—Kaveh Abrishamkar
(74) *Attorney, Agent, or Firm*—Zilka-Kotab, PC; Christopher J. Hamaty

(57) ABSTRACT

One embodiment of the present invention provides a system that facilitates software installation using embedded user credentials. The system receives a software installation package at a computer to be installed on the computer. The system then extracts an installation program from the software installation package. Next, the system determines if the current user has sufficient privileges to run the installation program. If not, the system recovers a set of user credentials from the software installation package that is associated with sufficient privileges to run the installation program. The system then authenticates to the computer using this set of user credentials. Finally, the system runs the installation program on the computer.

21 Claims, 2 Drawing Sheets

U.S. PATENT DOCUMENTS

| | | | |
|---|---|---|---|
| 7,069,581 B2* | 6/2006 | Fu et al. ......................... | 726/3 |
| 2002/0026588 A1* | 2/2002 | Sauvage ..................... | 713/200 |
| 2002/0178028 A1* | 11/2002 | King ............................ | 705/1 |
| 2004/0123141 A1* | 6/2004 | Yadav ........................ | 713/201 |

OTHER PUBLICATIONS ePolicy Orchestrator Product Guide, Version 2.0, McAfee, May 2001.

* cited by examiner

METHOD AND APPARATUS TO FACILITATE SOFTWARE INSTALLATION USING EMBEDDED USER CREDENTIALS

BACKGROUND

1. Field of the Invention

The present invention relates to computer software. More specifically, the present invention relates to a method and an apparatus to facilitate software installation on a computer using embedded user credentials.

2. Related Art

As enterprise systems grow to include large numbers of computer systems, the task of managing software for these enterprise systems becomes increasingly more challenging. Software management can encompass many aspects of configuring and maintaining the enterprise system, such as software distribution, configuration management, software management, and policy management, such as enforcing rules for virus scanners.

In smaller enterprise systems, it is feasible for an administrator to visit each computer within the enterprise to create the necessary configurations. However, as the enterprise grows or spreads to multiple locations, it quickly becomes impractical for the administrator to visit each computer.

Administrators, therefore, have developed methods to remotely configure the computers within an enterprise system. These methods include pushing software across a network such as the Internet to a remote site, and distributing portable storage media for installation at the remote site. While advantageous, these methods present their own set of problems.

Installing software on a computer typically requires that the installing entity be authenticated to the computer. For example, this authentication can include verifying a user name and a password, although other types of authentication are also possible. However, the installing entity, for example a user of the computer that is trying to install the software from a portable storage medium such as a floppy disk, may not have sufficient privilege level to accomplish the installation. The installation, therefore, will be aborted.

Typically, these software installations require access to the operating system to provide the necessary interface between the software and the operating system. It is not practical, therefore, to provide every user of a computer system with the necessary credentials for authenticating to the computer for these software installations.

What is needed is a method and an apparatus, which will allow installation of the software at a remote installation without the problems detailed above.

SUMMARY

One embodiment of the present invention provides a system that facilitates software installation using embedded user credentials. The system receives a software installation package at a computer to be installed on the computer. The system then extracts an installation program from the software installation package. Next, the system determines if the current user has sufficient privileges to run the installation program. If not, the system recovers a set of user credentials from the software installation package that is associated with sufficient privileges to run the installation program. The system then authenticates to the computer using this set of user credentials. Finally, the system runs the installation program on the computer.

In one embodiment of the present invention, the software installation package includes an agent that enforces security policies on the computer.

In one embodiment of the present invention, the software installation package includes a plurality of sets of user credentials.

In one embodiment of the present invention, if the set of user credentials failed during authentication, the system recovers a second set of user credentials from the plurality of sets of user credentials. The system then attempts to authenticate to the computer using the second set of user credentials.

In one embodiment of the present invention, the set of user credentials is encrypted.

In one embodiment of the present invention, the software installation package is received over a network.

In one embodiment of the present invention, the software installation package is received on a storage medium.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Propagating Software

Figure 1:
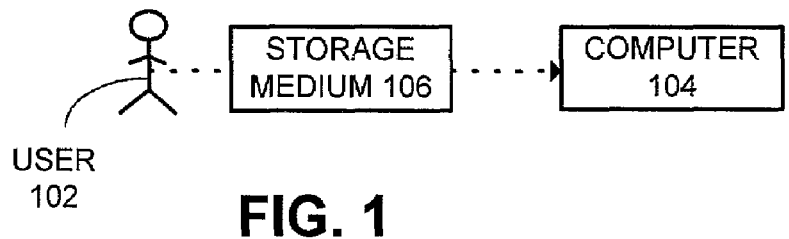
FIG. 1 illustrates computer 104 in accordance with an embodiment of the present invention.

FIG. 1 illustrates computer 104 in accordance with an embodiment of the present invention. Computer 104 can generally include any type of computer system, including, but not limited to, a computer system based on a microprocessor, a mainframe computer, a digital signal processor, a portable computing device, a personal organizer, a device controller, and a computational engine within an appliance. User 102 can install a software installation program from a software installation package stored on storage medium 106.

Storage medium 106 can include any type of non-volatile storage device that can be coupled to a computer system. This includes, but is not limited to, magnetic, optical, and magneto-optical storage devices, as well as storage devices based on flash memory and/or battery-backed up memory. Details of this software installation package and the process of installing the software installation program are described below in conjunction with FIGS. 3 and 4.

Figure 2:
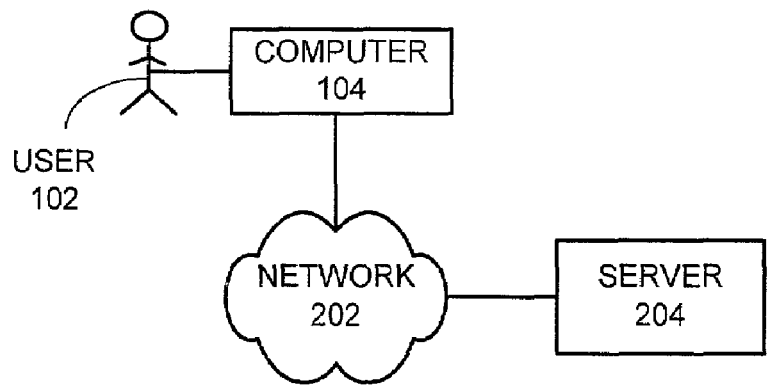
FIG. 2 illustrates computer 104 coupled to a network in accordance with an embodiment of the present invention.

FIG. 2 illustrates computer 104 coupled to a network in accordance with an embodiment of the present invention. User 102 can install a software installation program from a software installation package stored on server 204. Details of this software installation package and the process of installing the software installation program are described below in conjunction with FIGS. 3 and 4.

In an alternate embodiment of the present invention, the software installation package is pushed from server 204 across network 202. In this embodiment, the software installation program may be installed on computer 104 without intervention by user 102 or knowledge of the process by user 102.

Computer 104 and server 204 are coupled together across network 202. Network 202 can generally include any type of wire or wireless communication channel capable of coupling together computing nodes. This includes, but is not limited to, a local area network, a wide area network, or a combination of networks. In one embodiment of the present invention, network 202 includes the Internet.

Software Installation Package 302

Figure 3:
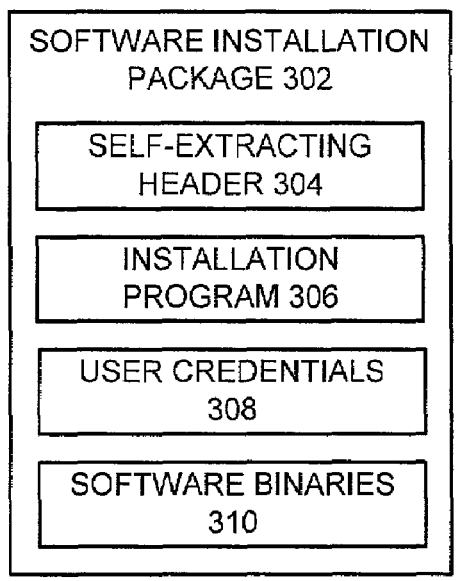
FIG. 3 illustrates software installation package 302 in accordance with an embodiment of the present invention.

FIG. 3 illustrates software installation package 302 in accordance with an embodiment of the present invention. Software installation package 302 includes self-extracting header 304, installation program 306, user credentials 308, and software binaries 310.

Self-extracting header 304 includes executable computer code, which is used to uncompress data and programs within software installation package 302. Installation program 306 includes computer code to install the various programs within software binaries 310. Typically, installation program 306 needs to authenticate itself to the computer, say computer 104, prior to computer 104 allowing installation program 306 to run.

User credentials 308 can be used by installation program 306 to authenticate to computer 104 in the case where user 102 does not have sufficient privilege to run installation program 306, or in the case where software installation package 302 is being pushed from server 204 across network 202 without the user's knowledge or assistance. User credentials 308 can include one or more user names with associated passwords, or other authentication credentials recognizable by computer 104. In one embodiment of the present invention, user credentials 308 are encrypted to provide security from compromise.

Software binaries can include an agent (not shown) for enforcing security policies on computer 104 and the necessary .dll files, data files, and the like for the agent to operate. This Agent typically runs as a background program on computer 104 and may run without the knowledge of user 102.

Installing the Software

Figure 4:
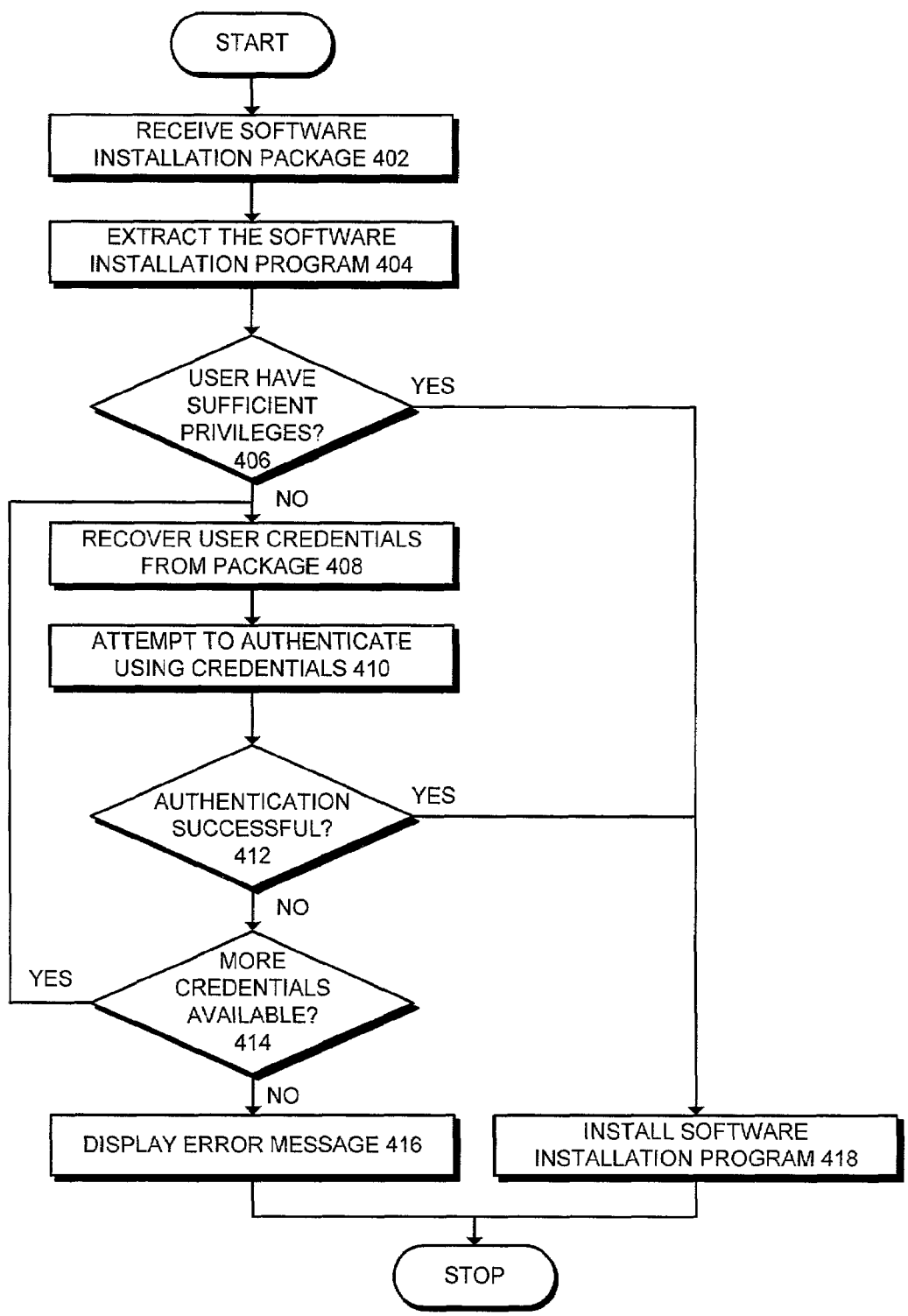
FIG. 4 is a flowchart illustrating the process of installing a software installation program in accordance with an embodiment of the present invention.

FIG. 4 is a flowchart illustrating the process of installing a software installation program in accordance with an embodiment of the present invention. The process starts when computer 104 receives software installation package 302 (step 402). Note that software installation package 302 can be received from storage medium 106, from server 204 across network 202, or by other equivalent means. Note further that software installation package 302 can be received by computer 104 either with or without an action by user 102.

Next, computer 104 extracts software installation program 306 from software installation package 302 (step 404). Computer 104 then determines if user 102 has sufficient privilege to run software installation program 306 (step 406). Note that this step may be skipped if the software is being pushed from server 204 without the knowledge of user 102.

If user 102 does not have sufficient privileges to run software installation program 306 on computer 104, computer 104 recovers a set of user credentials from software installation package 302 (step 408). Next, software installation package 302 attempts to authenticate to computer 104 using the credentials recovered from software installation package 302 (step 410). Computer 104 then determines if the authentication was successful (step 412).

If the authentication was not successful at step 412, computer 104 then determines if there are more credentials available in user credentials 308 (step 414). If so, the process returns to step 408 to recover the next set of credentials. If there are no more credentials available at step 414, computer 104 displays an error message (step 416).

If the user has sufficient privileges at step 406 or if the authentication was successful at step 412, computer 104 allows software installation program 306 to operate, thereby installing the software binaries (step 418).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to facilitate software installation using embedded user credentials, comprising:
   receiving a software installation package at a computer;
   extracting an installation program from the software installation package;
   determining if a current user has sufficient privileges to run the installation program;
   if the current user does not have sufficient privileges,
      recovering a set of user credentials that is associated with sufficient privileges to run the installation program from the software installation package, and
      authenticating to the computer using the set of user credentials,
   where the installation program authenticates itself to the computer using the set of user credentials; and
   running the installation program on the computer;
   wherein the software installation package includes a plurality of sets of user credentials;
   wherein the plurality of sets of user credentials each include a user name and an associated password;
   wherein an error message is displayed if none of the plurality of sets of user credential are associated with sufficient privileges to run the installation program from the software installation package.

2. The method of clan 1, wherein the software installation package includes an agent, wherein the agent enforces security policies on the computer.

3. The method of claim 1, further comprising:
recovering a second set of user credentials from the plurality of sets of user credentials if the set of user credentials failed during authentication; and
authenticating to the computer using the second set of user credentials.

4. The method of claim 1, wherein the set of user credentials is encrypted.

5. The method of claim 1, wherein the software installation package is received over a network.

6. The method of claim 1, wherein the software installation package is received on a storage medium.

7. The method of claim 1, wherein the installation program is run from a remote computer without knowledge of the current user.

8. The method of claim 1, further comprising:
determining if a subsequent set of user credentials from the plurality of sets of user credentials are available in the software installation package if the set of user credentials failed during authentication;
recovering the subsequent set of user credentials from the plurality of sets of user credentials included n the software installation package if it is determined that the subsequent set of user credentials is available; and
authenticating a second time to the computer using the subsequent set of user credentials.

9. The method of clan 1, wherein the installation program is installed without intervention by the current user.

10. The method of claim 1, wherein the installation program is installed without knowledge of the current user.

11. A computer-readable storage medium storing instructions that when executed by a computer cause the computer to perform a method to facilitate software installation using embedded user credentials, the method comprising:
receiving a software installation package at a computer;
extracting an installation program from the software installation package;
determining if a current user has sufficient privileges to run the installation program;
if the current user does not have sufficient privileges,
recovering a set of user credentials that is associated with sufficient privileges to run the installation program from the software installation package, and
authenticating to the computer using the set of user credentials,
where the installation program authenticates itself to the computer using the set of user credentials; and
running the installation program on the computer;
wherein the software installation package includes at least one set of user credentials;
wherein the plurality of sets of user credentials each include a user name and an associated password;
wherein an error message is displayed if none of the plurality of sets of user credentials are associated with sufficient privileges to run the installation program from the software installation package.

12. The computer-readable storage medium of claim 11, wherein the software installation package includes an agent, wherein the agent enforces security policies on the computer.

13. The computer-readable storage medium of claim 11, wherein the set of user credentials is encrypted.

14. The computer-readable storage medium of claim 11, wherein the software installation package is received over a network.

15. The computer-readable storage medium of claim 11, wherein the software installation package is received on a storage medium.

16. An apparatus to facilitate software installation using embedded user credentials, comprising:
a receiving mechanism that is configured to receive a software installation package at a computer;
an extracting mechanism that is configured to extract an installation program from the software installation package;
a determining mechanism that is configured to determine if a current user has sufficient privileges to run the installation program;
a recovering mechanism that is configured to recover a set of user credentials that is associated with sufficient privileges to run the installation program from the software installation package;
an authenticating mechanism that is configured to authenticate to the computer using the set of user credentials, where the installation program authenticates itself to the computer using the set of user credentials; and
a software executing mechanism that is configured to run the installation program on the computer;
wherein the software installation package includes a plurality of sets of user credentials;
wherein the plurality of sets of user credentials each include a user name and an associated password;
wherein an error message is displayed if none of the plurality of sets of user credentials are associated with sufficient privileges to run the installation program from the software installation package.

17. The apparatus of claim 16, wherein the software installation package includes an agent, wherein the agent enforces security policies on the computer.

18. The apparatus of claim 16,
wherein the recovering mechanism is further configured to recover a second set of user credentials from the plurality of sets of user credentials if the set of user credentials failed during authentication; and
wherein the authenticating mechanism is further configured to authenticate to the computer using the second set of user credentials.

19. The apparatus of claim 16, wherein the set of user credentials is encrypted.

20. The apparatus of claim 16, wherein the software installation package is received over a network.

21. The apparatus of claim 16, wherein the software installation package is received on a storage medium.

* * * * *

UNITED STATES PATENT AND TRADEMARK OFFICE
CERTIFICATE OF CORRECTION

| | |
|---|---|
| PATENT NO. | : 7,237,122 B2 |
| APPLICATION NO. | : 10/027615 |
| DATED | : June 26, 2007 |
| INVENTOR(S) | : Kadam et al. |

It is certified that error appears in the above-identified patent and that said Letters Patent is hereby corrected as shown below:

In the claims:

Claim 1, col. 4, line 61 replace "credential" with --credentials--;

Claim 1, col. 4, line 64 replace "clan" with --claim--;

Claim 8, col. 5, line 22 replace "n" with --in--;

Claim 9, col. 5, line 27 replace "clan" with --claim--.

Signed and Sealed this
Fifteenth Day of February, 2011

David J. Kappos
*Director of the United States Patent and Trademark Office*